(12) United States Patent
Eng et al.

(10) Patent No.: US 10,076,775 B1
(45) Date of Patent: Sep. 18, 2018

(54) MACHINE FOR LAYING AND ANCHORING A SHEET OF MATERIAL ON A GROUND SURFACE

(71) Applicant: EPI ENVIRONMENTAL PRODUCTS INC., Vancouver (CA)

(72) Inventors: Davie W. Eng, Vancouver (CA); John D. Mohr, Jr., Carmel, IN (US)

(73) Assignee: EPI Environmental Products Inc., Vancouver (CA)

( * ) Notice: Subject to any disclaimer, the term of this patent is extended or adjusted under 35 U.S.C. 154(b) by 0 days.

(21) Appl. No.: 15/664,427

(22) Filed: Jul. 31, 2017

(51) Int. Cl.
| B09B 1/00 | (2006.01) |
| B65G 25/06 | (2006.01) |
| A01G 13/02 | (2006.01) |
| E01C 23/00 | (2006.01) |

(52) U.S. Cl.
CPC ............ *B09B 1/004* (2013.01); *B65G 25/065* (2013.01); *A01G 13/0287* (2013.01); *E01C 23/00* (2013.01)

(58) Field of Classification Search
CPC combination set(s) only.
See application file for complete search history.

(56) References Cited

U.S. PATENT DOCUMENTS

| 3,534,875 | A | 10/1970 | Hallstrom |
| 4,856,645 | A | 8/1989 | Hallstrom |
| 5,340,264 | A * | 8/1994 | Quaeck ................. B65G 25/065 |
| | | | 198/750.5 |
| 5,355,994 | A | 10/1994 | Foster |
| 5,850,905 | A | 12/1998 | Foster |
| 6,651,806 | B2 | 11/2003 | Hallstrom |
| 6,782,994 | B1 | 8/2004 | Foster |
| 7,926,646 | B1 | 4/2011 | Berthelsen et al. |
| 8,616,365 | B2 | 12/2013 | Berthelsen et al. |
| 8,887,896 | B1 | 11/2014 | Berthelsen et al. |
| 9,090,193 | B2 | 7/2015 | Cook et al. |
| 9,440,268 | B2 | 9/2016 | Kozak et al. |
| 2012/0145518 | A1 * | 6/2012 | Almond ............... B65G 25/065 |
| | | | 198/617 |
| 2015/0336142 | A1 * | 11/2015 | Kozak ..................... B09B 1/004 |
| | | | 405/129.9 |
| 2017/0029216 | A1 | 2/2017 | Jackson et al. |
| 2017/0144841 | A1 | 5/2017 | Jackson et al. |
| 2017/0314579 | A1 * | 11/2017 | Berthelsen ............. F15B 11/22 |

FOREIGN PATENT DOCUMENTS

| WO | 2011029076 | 3/2011 |
| WO | 2012061918 | 5/2012 |

* cited by examiner

*Primary Examiner* — Kyle Armstrong
(74) *Attorney, Agent, or Firm* — Oyen Wiggs Green & Mutala LLP

(57) ABSTRACT

A tracked, self-propelled machine for laying a film and depositing ballast on it to cover a landfill or other ground area. The machine (20) has a ballast box (28) with a reciprocating slat floor (38) and an end gate (34) for holding the ballast (50). A ballast distribution module (58) at the back of the ballast box has a pair of conveyors (68, 70) separated by a gap (72). A roll of film (96) is held by a film roll support mechanism (94) at the back of the machine for unwinding onto the ground surface as the machine moves forward. Ballast is moved to the back of the box by the reciprocating slat floor and is released from an opening (52) under the end gate onto the conveyors and into the gap for deposition onto the laid film.

11 Claims, 5 Drawing Sheets

MACHINE FOR LAYING AND ANCHORING A SHEET OF MATERIAL ON A GROUND SURFACE

FIELD OF THE INVENTION

The invention pertains to machines for laying and anchoring films on ground surfaces such as landfills to form a barrier between the ground surface and the environment.

BACKGROUND OF THE INVENTION

The covering of landfills is a practice required by regulation in many jurisdictions. For example, it is often required that the daily fill of garbage be covered at the end of the day, or that the landfill be covered when it is not in operation. It is known in the industry to lay strips of film, such as degradable polyethylene, in a side-by-side or overlapping arrangement to cover the landfill, and to place ballast (anchoring material) such as dirt on the film to hold it in place. In the present disclosure, the term "film" includes membranes, textiles, sheathing materials, and similar sheet-like material suitable as a ground cover. The ground area that requires regular covering in a landfill may be very large, and machines have been developed to apply strips of film to cover such areas.

WO 2012/061918 (Kozak) and U.S. Pat. No. 9,440,268 (Kozak et al.), which are incorporated herein by reference, disclose a tracked, self-propelled machine for laying a film and depositing ballast on it to cover a landfill. A roll of film is supported at the back of the machine for unwinding onto the ground surface as the machine moves forward, and ballast is released from the back of a box on the machine and is deposited on the laid film.

In prior art machines of this type, the ballast is moved to the back of the ballast box for release onto the laid film by means of a hydraulic chain floor, which has spaced-apart pairs of chains connected to bars extending transversely to the longitudinal axis of the machine, to engage and move the ballast. However, the ballast available at landfill sites often includes large rocks and pieces of concrete. When such material is loaded into the box, for example by being dropped from the bucket of a front-end loader, the chains are liable to be damaged or broken, rendering the chain floor inoperable.

There is a need for a film-laying machine which can use ballast of the type that can damage chain floors, and ballast of significantly different densities.

SUMMARY OF THE INVENTION

The present inventors have developed a film-deploying machine that can be used to apply a film to a landfill and can employ a wide range of ballast materials, including heavy and rocky ballast. The film-deploying machine has a reciprocating slat-type conveyor for receiving and moving the ballast towards the exit end of the ballast box. The reciprocating slat-type conveyor provides a robust floor that can receive and transport heavy and rocky anchoring material. The machine is adapted to be propelled at various speeds and to deposit ballast at various rates, depending upon the local conditions, terrain, type of ballast, etc.

One aspect of the invention provides a machine for laying a film on a ground surface and depositing ballast on the laid film, comprising: a ballast box for holding the ballast, the ballast box having a front end and a back end; a reciprocating slat conveyor for moving the ballast toward the back end of the ballast box, the slat conveyor forming the floor of the ballast box and comprising a plurality of floor slats arranged adjacent to each other and parallel to a longitudinal axis of the ballast box; an opening at the back end of the ballast box for release of the ballast therefrom; a first conveyor and a second conveyor separated by a gap, the first and second conveyors and the gap being arranged to receive the ballast released from the ballast box opening; and a holder for holding a roll of the film for unwinding of the film onto the ground surface as the machine is propelled, whereby the ballast is deposited onto the film from the first and second conveyors and the gap.

Another aspect of the invention provides a machine for laying a film on a ground surface and depositing ballast on the laid film, comprising: a ballast box for holding the ballast, the ballast box having an opening at one end for release of ballast onto the film; a reciprocating slat conveyor for moving the ballast toward the opening of the ballast box, said slat conveyor comprising a plurality of floor slats arranged adjacent to each other and parallel to a longitudinal axis of the machine; and a holder for holding a roll of the film for unwinding of the film onto the ground surface as the machine is propelled, whereby the ballast is deposited onto the laid film.

Further aspects of the invention and features of specific embodiments of the invention are described below.

DETAILED DESCRIPTION

Figure 1:
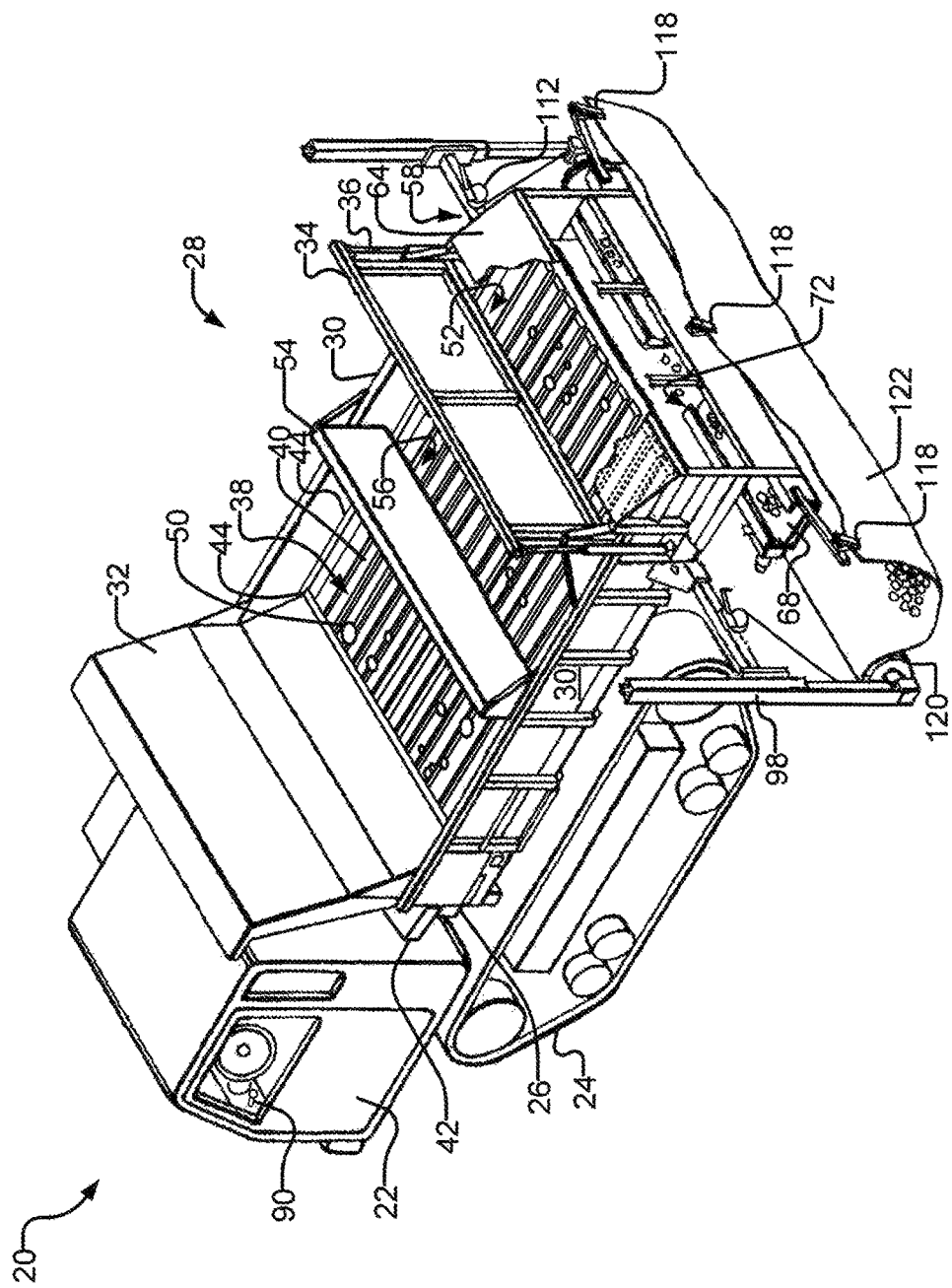
FIG. 1 is a side perspective view of a film-deploying machine according to one embodiment.
Figure 2:
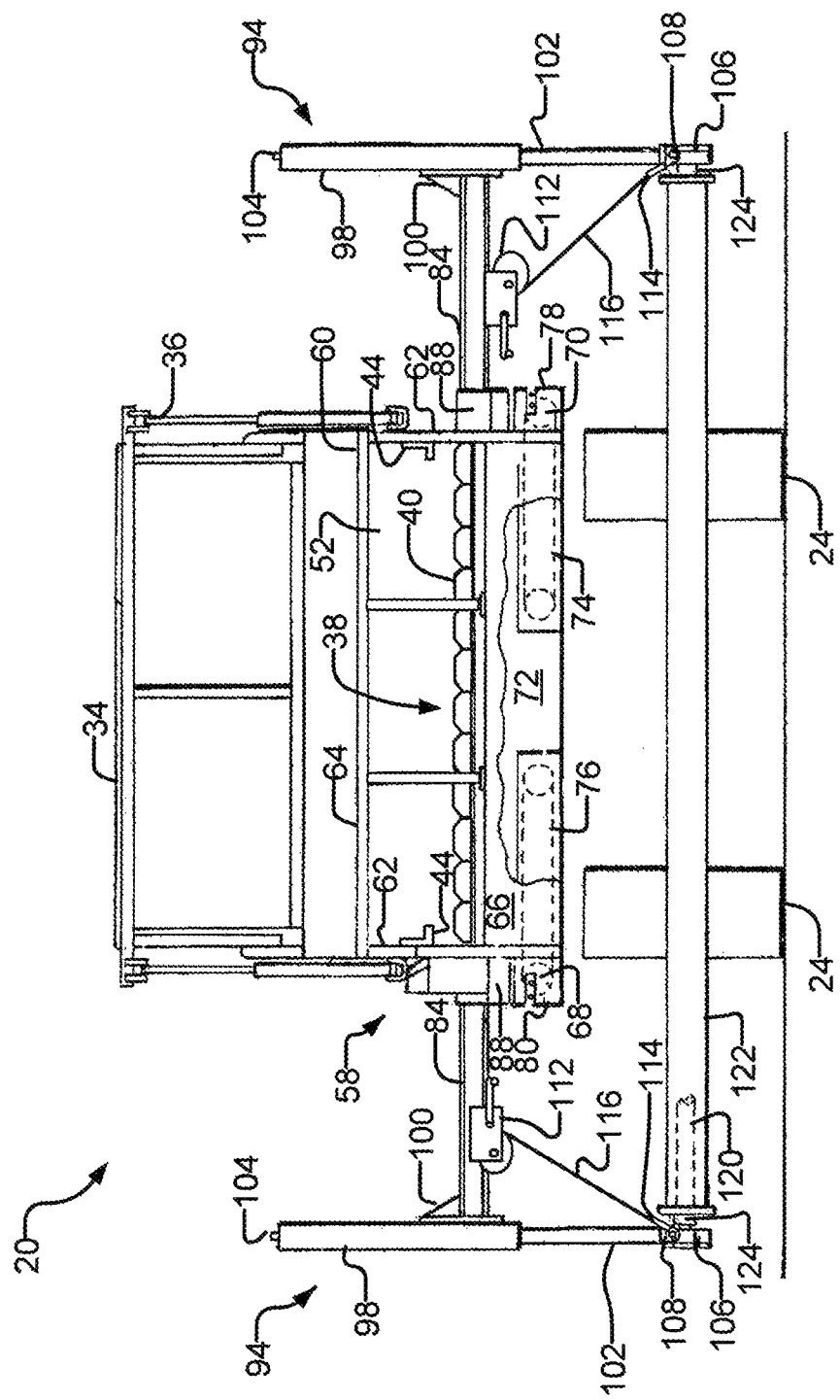
FIG. 2 is a partially cut-away back elevation view of the embodiment of FIG. 1.
Figure 3:
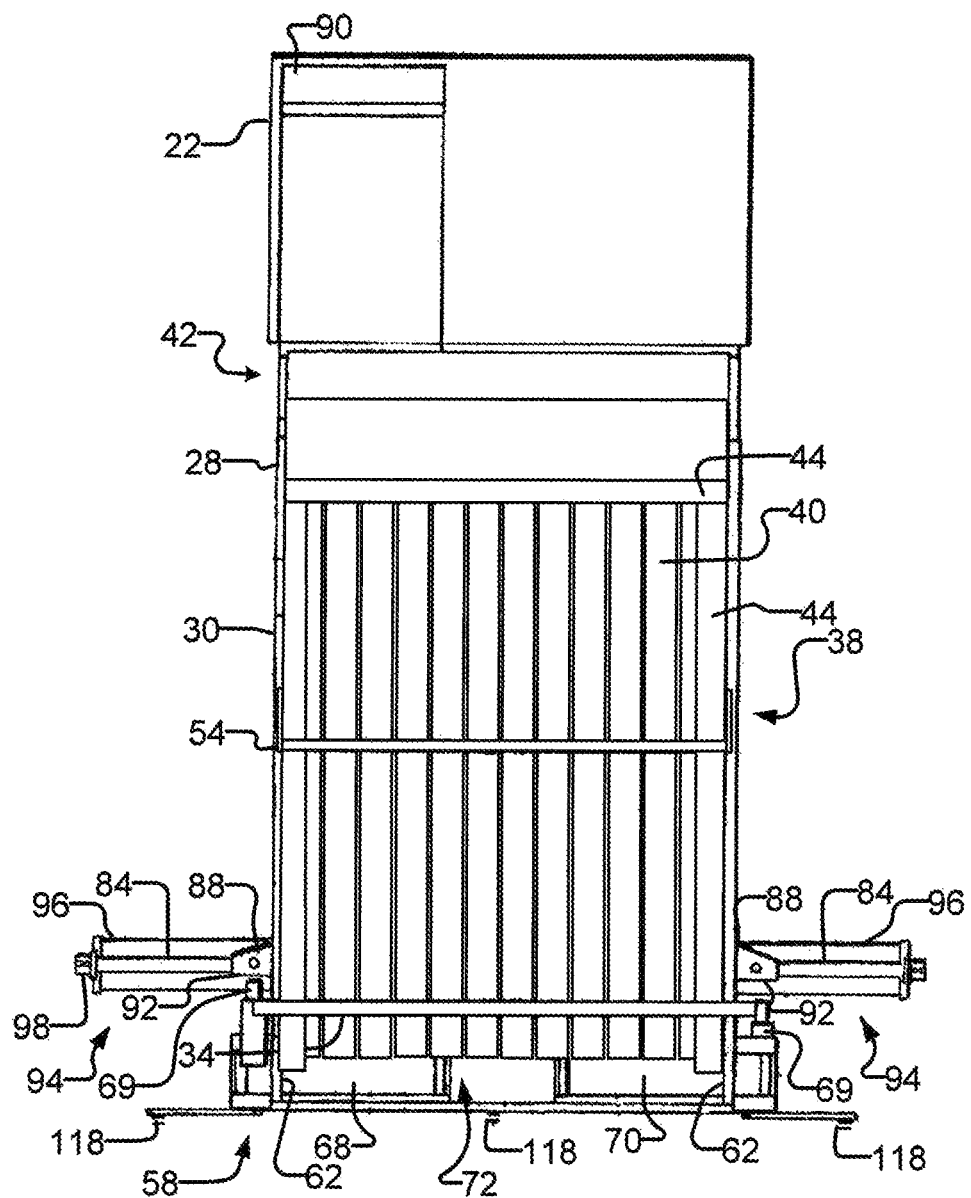
FIG. 3 is a partially cut-away top plan view of the embodiment of FIG. 1.
Figure 4A:
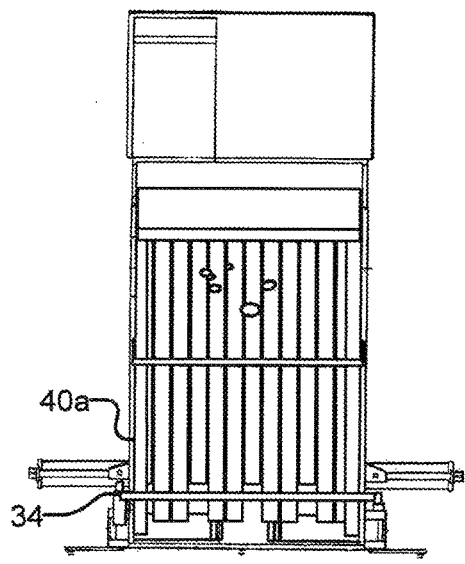
FIGS. 4A-4D illustrate how the embodiment of FIG. 1 conveys anchoring material in the ballast box.
Figure 4B:
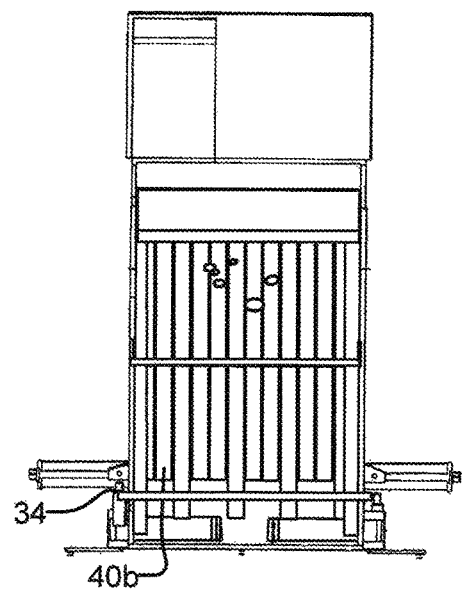
Figure 4C:
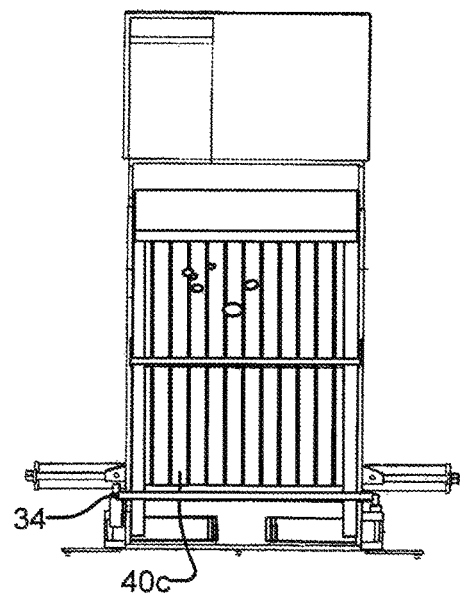
Figure 4D:
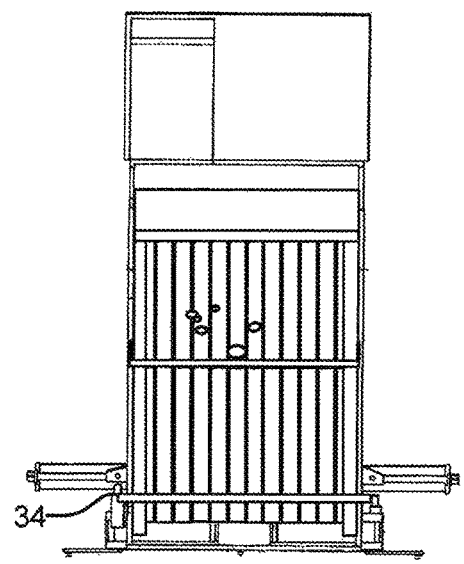

FIGS. 1 to 3 illustrate one embodiment of a film-deploying machine 20, intended particularly for use in covering landfills, though also useful for covering ground surfaces in applications such as farming, mining and road construction. The film-deploying machine 20 is a motorized, self-propelled tracked vehicle having an operator's cab 22 at the forward end of the vehicle, a track 24 and a frame 26 supporting a ballast box 28. The ballast box 28 has side walls 30, a front wall or hood 32 behind the operator's cab 22 and an end gate 34 at the back end. The end gate 34 is vertically movable by means of hydraulic cylinders. The ballast 50 may comprise materials that include dirt, clay, gravel, sand, crushed stone, sludge, rocks, and pieces of asphalt and concrete, large and small.

The ballast box 28 has a reciprocating slat conveyor 38, forming the floor of the ballast box, for moving the ballast towards the back end of the ballast box, from which it is released. Reciprocating slat conveyors are well known in the conveying art for certain applications. They have multiple parallel slats that make up a floor, the slats being divided into three or more independent groups and each group being drivable back-and-forth in a reciprocating action. The reciprocating action is carried out in a series of steps. First, all groups of slats move simultaneously in one direction, thereby conveying the load a short distance in that direction. Then, one group of slats is retracted in the opposite direction while the load is supported by the remaining two or more groups of stationary slats. The greater friction between the load and the stationary slats allows the retracting slats to slide underneath the load without moving the load. Then the other groups of slats are retracted, one group at a time, and the cycle is repeated. Examples of reciprocating slat-type conveyors in the patent literature include U.S. Pat. No. 3,534,875 (Hallstrom), U.S. Pat. No. 4,856,645 (Hallstrom), U.S. Pat. No. 5,355,994 (Foster), U.S. Pat. No. 5,850,905 (Foster), U.S. Pat. No. 6,651,806 (Hallstrom), U.S. Pat. No. 6,782,994 (Foster), U.S. Pat. No. 7,926,646 (Berthelsen et al.), U.S. Pat. No. 8,616,365 (Berthelsen et al.), U.S. Pat. No. 8,887,896 (Berthelsen et al.), U.S. Pat. No. 9,090,193 (Cook et al.), U.S. Pat. No. 2017/0029219(Jackson et al.), U.S. Pat. No. 2017/0144841 (Jackson et al.), and WO 2011/029076 (Almond et al.), the disclosures of which are incorporated herein.

Referring to FIGS. 1 to 3, the reciprocating slat conveyor 38 has a plurality of identical sliding slats 40, there being twelve such slats in the illustrated embodiment. The slats 40 are arranged side-by-side across the width of the ballast box 28 and extending parallel to the longitudinal axis of the ballast box. Protective strips 44 made of angle iron are welded to the side walls 30 of the ballast box above the edges of the outer floor slats, and on the front wall 32, to provide protection from dropped ballast materials onto the edges of the floor slats.

The slats 40 are driven back-and-forth in the longitudinal direction, in a reciprocating action, by a conventional power drive unit 42. The power drive unit is located in a cavity under the front hood 32 of the ballast box, forward of the slats 40, a position that is accessible for maintenance and is protected from the impact of ballast dropped into the ballast box.

The reciprocating action of the slats is carried out in a series of steps, shown in FIGS. 4A-4D. In three separate stages, shown in FIGS. 4A-C, one third of the slats 40a, followed by another one third 40b, and followed the remaining one third 40c, move towards the front end of the ballast box 28, until all the slats are retracted. Then, all the slats 40 move together towards the back end of the ballast box, the position shown in FIG. 4D, thereby conveying the ballast 50 towards the end gate 34. Repetition of this cycle gradually releases all the ballast from the back end of the ballast box.

When the end gate 34 is raised, there is an opening 52 between the floor, i.e. the upper surface of the slats 40, and the lower edge of the end gate, through which the ballast can pass. The height of the opening 52 is controllable by the operator by actuation of the hydraulic cylinders 36, to regulate the flow of ballast out of the box.

The ballast box 28 also has a center gate 54 about half-way between the front wall 32 and the end gate 34, extending between the side walls 30. There is a space 56 between the slats 40 and the lower edge of the center gate. The vertical position of the center gate is adjustable to adjust the height of the space 56, either manually or hydraulically by the operator. The center gate is used to regulate the movement of anchoring material within the ballast box as the reciprocating slat conveyor is operated.

A ballast distribution module 58, best seen in FIGS. 2 and 3, is disposed at the back end of the ballast box 28. It comprises a frame 60 with two side panels 62, a top panel 64 and a rear panel 66. Two conveyors 68, 70 are disposed in the frame 60, separated by a gap 72 and oriented transverse to the longitudinal axis of the machine 20. The conveyors 68, 70 comprise conveyor belts 74, 76 and associated rollers and hydraulic motors 69. The belts 74, 76 are continuous-type conveyor belts, having no mechanical seams or joints. They are positioned below the level of the reciprocating slat floor, so that ballast that falls off the back end of the reciprocating slat conveyor falls onto the belts 74, 76 and into the gap 72 that separates them. In use, the belts 74, 76 are driven a direction so as to convey the ballast towards to the outer ends 78, 80 respectively, of the conveyors.

As best seen in FIGS. 1 and 3, the two conveyor motors 69 are positioned at the front (forward) side of the conveyor belt assembly. This avoids problems that can arise if the motors were positioned at the back side of the conveyor assembly, namely, that the motors could drag on the working face of the landfill where, for example, the landfill slope is steep, or there are soft spots within the working face. Dragging of conveyor motors on the working face would damage the Motor seals and hydraulic hoses, and cause misalignment of the conveyors.

Two pivoting arms 84 are disposed on the frame 26 near the back end of the ballast box 28 on the left and right sides respectively of the machine. Each arm 84 is pivotally connected to the frame by a respective bracket 88. The brackets are open at their forward side to permit the arms to pivot forward into a position adjacent to the respective sides of the machine. The brackets are closed by a bracket wall 92 at their rearward side to limit the rearward pivotal movement of the arms and define an operating position for the arms, in which they extend outwardly from the sides of machine at a right angle thereto. Film roll support mechanisms are connected to the respective pivoting arms.

Figure 5:
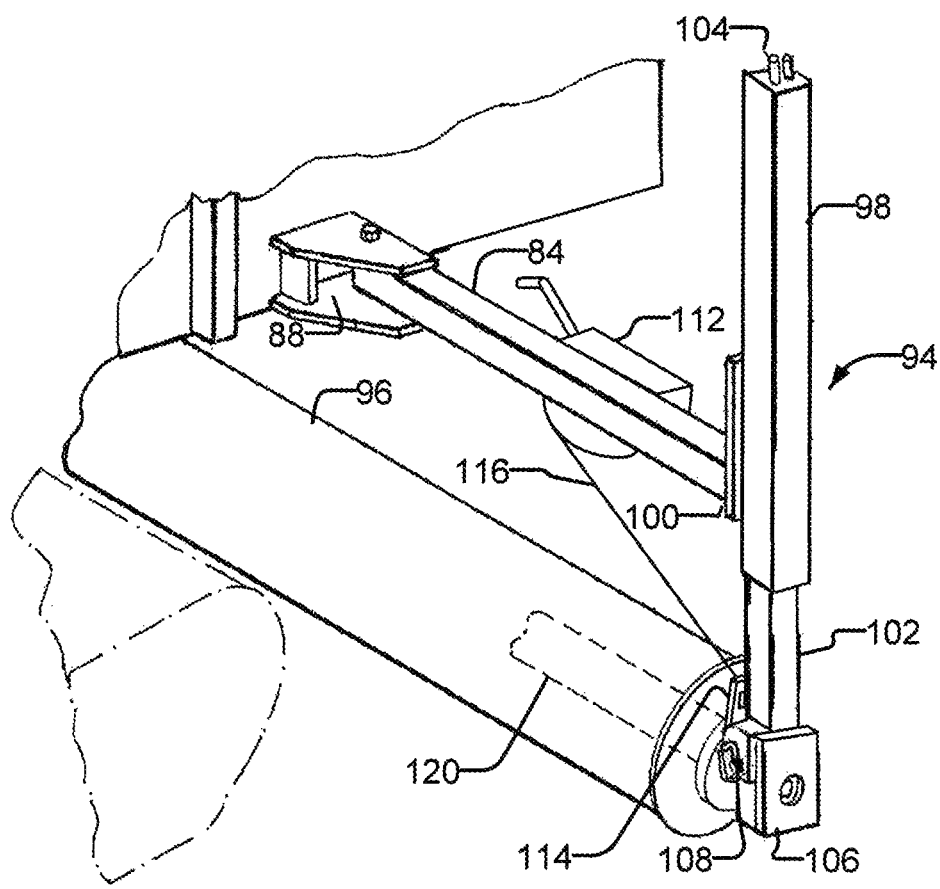
FIG. 5 is a detailed view of a pivot arm and film roll support mechanism.

Referring to FIG. 5, each pivoting arm 84 is connected to a film roll support mechanism 94, having a hydraulically-operated means for holding, raising and lowering a film roll 96. An outer hydraulic cylinder member 98 is attached to the distal end of the arm 84 by a mounting bracket 100. An inner cylinder member functioning as a vertically-movable arm 102 is moveable within the outer cylinder 98, between a retracted position, in which the movable arm 102 is substantially inside the outer cylinder member 98 and an extended position, in which the moveable arm 102 extends downwardly from the outer cylinder member 98. Hydraulic fittings 104 are provided on the top of the outer cylinder member 98 for the inflow and outflow of hydraulic fluid through conduits (not shown) connected to a hydraulic control system under the control of an operator in the cab.

A film roll support bracket 106 is removably attached to the movable arm 102 at its lower end by means of a bracket pin 108. The support bracket 106 has bearings 110 for the rotational support of a film roll end cap (top hat) 124, as further described below.

The film roll support mechanism 94 includes means for raising the film roll 96 from the ground to attach it to the film roll support bracket 106, and to lower an emptied roll back to the ground. A manually-operated winch 112 is affixed to the lower side of the pivoting arm 84 and a winch bracket 114 extends from the film roll support bracket 106. A cable 116 from the winch 112 is attached by a hook to the winch bracket. When the bracket pin 108 is removed, the film roll support bracket 106 is disengaged from the moveable arm 102, permitting it to be lowered or raised by operation of the winch 112.

The film roll support mechanism 94 on the right side of the machine, attached to the right side pivot arm 84, is the mirror image of the film roll support mechanism 94 shown in FIG. 5.

Figure 6:
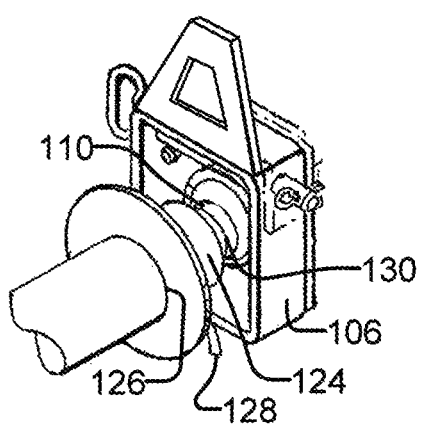
FIG. 6 is a detailed view of a film roll support bracket and top hat.

The film roll 96 has an inner cylindrical spool or core on which the film 122 is wound. The core is fitted loosely over a mandrel tube 120. A length of the mandrel tube 120 at either end extends past the edge of the wound film for engagement in a respective top hat 124. As seen in FIG. 6, the top hat has a tubular portion 126 that receives the end of the mandrel tube 120 and is locked to it by means of a top hat tube pin 128. The top hat also has a bearing shaft 130 that engages with the top hat bearings 110 of the film roll support brackets 106. Accordingly, the film roll 96 is rotatably held by the film roll support brackets 106 for unwinding of the film from the roll.

Three clips 118 are arranged at the back of the distribution module 58 for attaching the end of a strip of film 122 when commencing deployment, and after a strip is laid and cut.

The cab 22 includes operator controls for actuating and controlling the speed of the conveyors 68, 70, for raising and lowering the end gate 34, for controlling the direction and speed of the vehicle, and for hydraulically raising and lowering the film roll by the film roll support mechanism 94.

A slat conveyor controller 90 is provided in the cab for controlling the operation of the reciprocating slat conveyor by the operator. Its functions include variable speed control. It is desirable for the operator to be able to operate the slat conveyor more slowly when the ballast comprises heavy material such as rocks or concrete, in comparison to the faster speed that is better when the ballast comprises lighter material, such as sand or soil. The selected speed of the conveyor 38, and thus the amount of ballast deposited in a given time, for a given travelling speed of the machine 20, is a reflection of the weight of ballast that is required to anchor a given area of laid film.

The controller 90 includes a reverse function that allows the reciprocating slat conveyor 38 to operate in the reverse manner to that described above for releasing ballast from the back end of the ballast box. In reverse mode, the slats 40 move material towards the front end of the ballast box. This is useful when a large object, such as a log of wood, has been deposited in the ballast box and becomes jammed; the reverse function is used to cause the object to become dislodged and it may then be discharged using the normal operating mode of the slat conveyor.

Throughout the foregoing description and the drawings, in which corresponding and like parts are identified by the same reference characters, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the foregoing disclosure, many alterations and modifications are possible in the practice of this invention without departing from the scope thereof. Accordingly, the scope of the invention is to be construed in accordance with the following claims.

The invention claimed is:

1. A machine for laying a film on a ground surface and depositing ballast on the laid film, the machine being movable over the ground surface, comprising:
   (a) a ballast box for holding the ballast, the ballast box having a front end, side walls, a back end and a hood at the front end;
   (b) a reciprocating slat conveyor for moving the ballast toward the back end of the ballast box, said reciprocating slat conveyor forming the floor of the ballast box and comprising a plurality of floor slats arranged adjacent to each other and parallel to a longitudinal axis of the ballast box, wherein the reciprocating slat conveyor further comprises a power drive unit and the power drive unit is located in a cavity under the hood, forward of the floor slats;
   (c) an opening at the back end of the ballast box for release of the ballast therefrom;
   (d) a first conveyor and a second conveyor separated by a gap, the first and second conveyors and the gap being arranged to receive the ballast released from the ballast box opening;
   (e) a holder for holding a roll of the film for unwinding of the film onto the ground surface as the machine is propelled, whereby the ballast is deposited onto the film from the first and second conveyors and the gap; and
   (f) protective strips on the side walls of the ballast box extending over outer edges of the floor slats that are adjacent to the side walls, and a protective strip on the hood of the ballast box extending over front edges of the floor slats.

2. The machine according to claim 1, further comprising a reciprocating slat conveyor variable speed controller arranged to control a speed of the reciprocating slat conveyor.

3. The machine according to claim 2, wherein the machine is adapted to move at various speeds, and to deposit ballast at various rates while in motion.

4. The machine according to claim 1, further comprising a reciprocating slat conveyor reverse function controller arranged to operate the reciprocating slat conveyor in a reverse direction for moving ballast toward the front end of the ballast box.

5. The machine according to claim 1, wherein the floor slats comprise at least three independently-operable groups of slats, each group being drivable in the ballast box in a rearward, conveying direction and in a forward, retracting direction.

6. The machine according to claim 1, wherein the first conveyor and the second conveyor each comprise a respective drive motor positioned at a front side of the respective conveyor.

7. A machine for laying a film on a ground surface and depositing ballast on the laid film, comprising:
   (a) a ballast box for holding the ballast, the ballast box having a front end, side walls, a back end, a hood at the front end and an opening at the back end for release of ballast onto the film;
   (b) a reciprocating slat conveyor for moving the ballast toward the opening of the ballast box, said reciprocating slat conveyor comprising a plurality of floor slats arranged adjacent to each other and parallel to a longitudinal axis of the machine, wherein the reciprocating slat conveyor further comprises a power drive unit, and the power drive unit is located in a cavity under the hood, forward of the floor slats;
   (c) a holder for holding a roll of the film for unwinding of the film onto the ground surface as the machine is propelled, whereby the ballast is deposited onto the laid film; and (d) protective strips on side walls of the ballast box extending over outer edges of the floor slats that are adjacent to the side walls, and a protective strip on the hood of the ballast box extending over front edges of the floor slats.

8. The machine according to claim 7, further comprising a reciprocating slat conveyor variable speed controller arranged to control a speed of the reciprocating slat conveyor.

9. The machine according to claim 8, wherein the machine is adapted to move at various speeds, and to deposit ballast at various rates while in motion.

10. The machine according to claim 7, wherein the floor slats comprise at least three independently-operable groups of slats, each group being drivable in the ballast box in a rearward, conveying direction and in a forward, retracting direction.

11. The machine according to claim 7, further comprising a reciprocating slat conveyor reverse function controller arranged to operate the reciprocating slat conveyor in a reverse direction for moving ballast toward the front end of the ballast box.

\* \* \* \* \*